E. A. SCHLAIRET.
RESILIENT WHEEL.
APPLICATION FILED JULY 31, 1912.
1,076,914.
Patented Oct. 28, 1913.
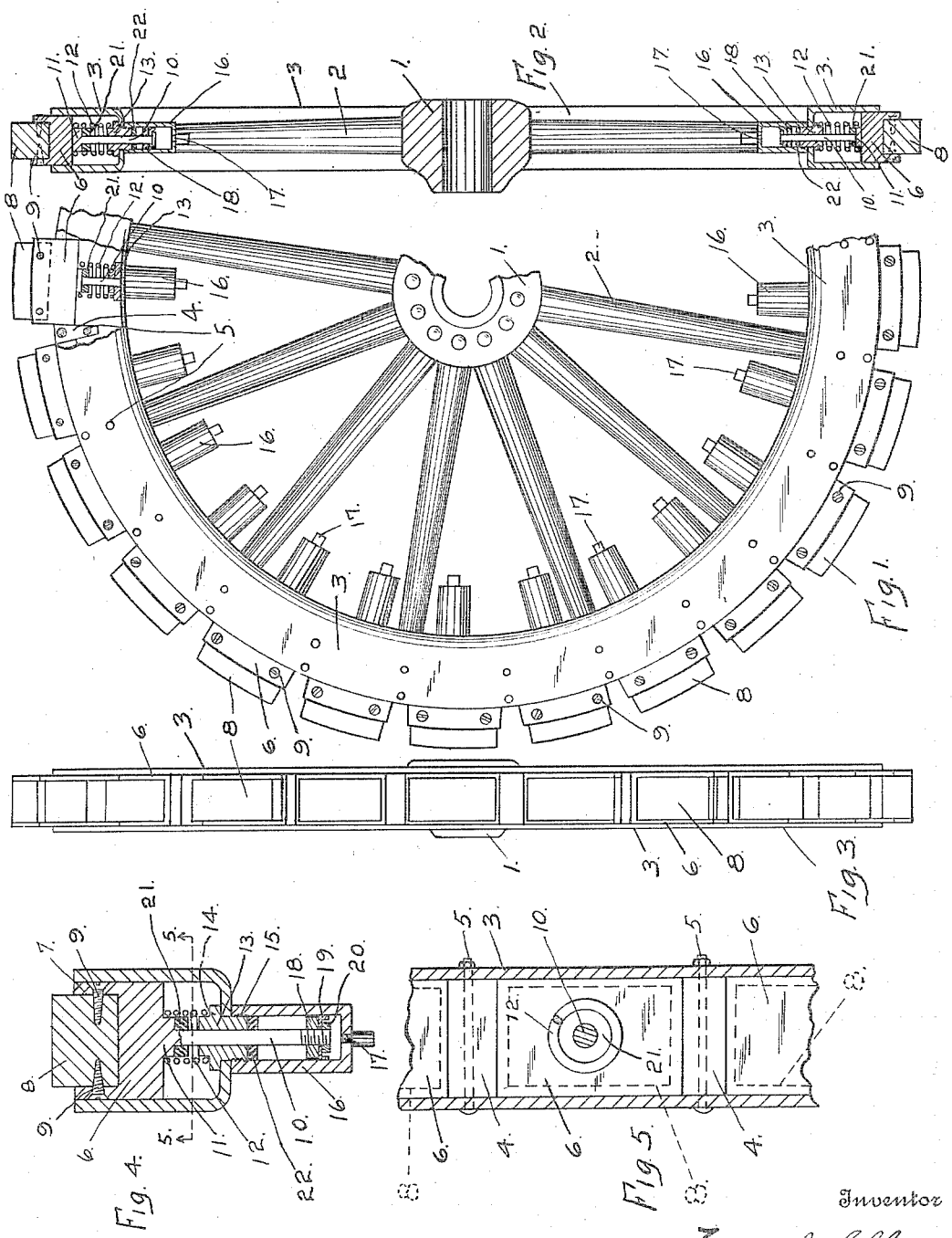

UNITED STATES PATENT OFFICE.

EDWARD A. SCHLAIRET, OF MOUNT VERNON, OHIO.

RESILIENT WHEEL.

1,076,914. Specification of Letters Patent. Patented Oct. 28, 1913.

Application filed July 31, 1912. Serial No. 712,425.

*To all whom it may concern:*

Be it known that I, EDWARD A. SCHLAIRET, a citizen of the United States, residing at Mount Vernon, in the county of Knox and State of Ohio, have invented certain new and useful Improvements in Resilient Wheels, of which the following is a specification.

My invention relates to resilient wheels and particularly pertains to that class of wheel structure which practically eliminates the pneumatic tire and aims to give substantially the same degree of rigidity by the provision of a plurality of tread elements which are given a semi-pneumatic and spring resistance in their movement radially due to frictional contact with the surface over which they travel.

In the preferred embodiment of my invention it comprises a central wheel structure embodying a hub, spokes and a rim element and having a plurality of radially arranged blocks carrying wooden tread surfaces and plunger elements for resisting movement of such blocks under pressure upon their said surfaces.

The preferred embodiment of my invention is shown in the accompanying drawings, in which similar characters of reference designate corresponding parts, and in which—

Figure 1 is a side elevation of a section of my wheel structure partially broken away, Fig. 2 is a vertical transverse section through the wheel structure, Fig. 3 is an edge view or a view looking at the tread of the wheel, Fig. 4 is a sectional view of one of the resilient blocks of my wheel structure, and, Fig. 5 is a section taken on line 5—5 of Fig. 4.

In the drawings, the wheel structure is shown as comprising a hub 1, spokes 2 and a rim element 3, which rim element is desirably of channel formation and provided at intervals with V-shaped spacing blocks 4. These V-shaped spacing blocks may be maintained in position by bolts 5. Disposed between said spacing blocks and preferably two between each pair of spokes, are blocks 6 of metal having channels 7 in their outer surfaces for the reception of wooden blocks 8 to be secured in position by screws 9. These metal blocks 6 are provided with inwardly extending integral bolts 10 having shoulders 11 which are embraced by coil springs 12. These bolts 10 extend through bushings 13 having shoulders 14 thereon and threaded as at 15 and these bushings are threaded for the reception of tubular casings 16 apertured at their lower ends as at 17. The bolts 10 at their extremities carry piston members comprising a metal piece 18, a washer of cup-like form as at 19 and a securing nut 20, which pistons are sufficiently close fitting within the tubular members 16 to have an air cushioning effect in the inward movement of the blocks 6. This air cushioning effect is assisted by the operation of the springs 12 and also by the operation of a resilient washer 21 disposed between the bushing 13 and the shoulder 11 and by a similar resilient washer 22 disposed between the inner ends of the bushings 13 and the pistons on the ends of the bolt structure.

In operation, it will be understood that the wooden blocks 8, which may be made of any type of prepared wood, will first come into contact with the surface over which the wheel is traveling, causing an inward movement of the blocks 6 and a consequent compression of the springs 12. Furthermore, the inward movement of these blocks 6 will result in an air cushioning effect through the pistons operating in the tubular members 6 and under extreme conditions there will be interposed a further resistance of the resilient washers described.

It will be apparent from this that I have provided a resilient wheel comprising a series of yieldable tread members, which combines a mechanical spring action with a semi-pneumatic action. This result is attained by a simple and compact structure of an inherently superior nature.

What I claim is—

A resilient vehicle wheel comprising a hub portion, spokes radiating therefrom, a rim element of channel form attached to the outer extremities of said spokes, individual inwardly extending cylinders independent of and between said spokes, each of said cylinders having an internally threaded open end, a central apertured bushing for each of said cylinders having a threaded extremity for engagement with the threaded ends of said cylinders, a shoulder on each of said bushings adapted to abut the bottom of said channeled member whereby the said cylinders are rigidly held thereon, a plurality of double-ended pistons slidably mounted in said bushings, one end of each of said pistons operating in said cylinders, the other ends slidingly operating in said channel rim element, buffers carried by the underside of each of said bushings and said last pistons, said cylinders forming an air cushion below said first piston ends, springs interposed between said second piston ends and said rim element, and thread elements removably carried by each of said second piston ends.

In testimony whereof I affix my signature in presence of two witnesses.

EDWARD A. SCHLAIRET.

Witnesses:
H. M. GILLESPIE,
A. L. PHELPS.